(12) United States Patent
Turner et al.

(10) Patent No.: US 7,213,467 B2
(45) Date of Patent: May 8, 2007

(54) FLOWMETER

(75) Inventors: Roger Turner, Gloucestershire (GB); John Emmerson, Hampshire (GB); David Lincoln, Bristol (GB); Craig Howarth, Worcestershire (GB); Wu Jin, Hull (GB); Steven Gray, West Yorkshire (GB); Michael Evans, Bedfordshire (GB)

(73) Assignee: Elster Metering Limited, Bedfordshire (GB)

( * ) Notice: Subject to any disclaimer, the term of this patent is extended or adjusted under 35 U.S.C. 154(b) by 17 days.

(21) Appl. No.: 10/468,258

(22) PCT Filed: Feb. 5, 2002

(86) PCT No.: PCT/GB02/00493

§ 371 (c)(1),
(2), (4) Date: Jul. 1, 2004

(87) PCT Pub. No.: WO02/063250

PCT Pub. Date: Aug. 15, 2002

(65) Prior Publication Data

US 2004/0250629 A1    Dec. 16, 2004

(30) Foreign Application Priority Data

| Feb. 6, 2001 | (GB) | ................................ 0102941.2 |
| Jul. 16, 2001 | (GB) | ................................ 0117291.5 |
| Jul. 16, 2001 | (GB) | ................................ 0117292.3 |

(51) Int. Cl.
*G01F 1/58* (2006.01)

(52) U.S. Cl. .................................................. 73/861.12

(58) Field of Classification Search ............. 73/861.12, 73/861.63, 861.15
See application file for complete search history.

(56) References Cited

U.S. PATENT DOCUMENTS

| 1,817,617 | A |   | 8/1931 | Gosch |
| 2,187,914 | A |   | 1/1940 | Reitan |
| 2,706,402 | A |   | 4/1955 | Jones |
| 3,444,728 | A |   | 5/1969 | Burns |
| 3,471,068 | A |   | 10/1969 | Foreman |
| 3,686,948 | A | * | 8/1972 | Lahaye .................... 73/861.83 |
| 3,879,990 | A |   | 4/1975 | Joy |
| 4,125,019 | A |   | 11/1978 | Cushing |
| 4,459,858 | A |   | 7/1984 | Marsh |
| 4,554,828 | A | * | 11/1985 | Doll ........................... 73/202 |

(Continued)

FOREIGN PATENT DOCUMENTS

DE        003434068 A1    3/1986

(Continued)

OTHER PUBLICATIONS

L.L.Bean Catalog, Spring 2004, pp. 59,64,65,and 67.

(Continued)

*Primary Examiner*—Jewel Thompson
(74) *Attorney, Agent, or Firm*—Hodgson Russ LLP

(57) ABSTRACT

An electromagnetic flow meter is configured as an insert for insertion into an in-situ housing connected in a flow line. This can enable a body previously installed for use with an insert of a mechanical flow meter to be adapted for use with an insert of an electromagnetic flow meter without having to disconnect the body from a mains supply.

27 Claims, 12 Drawing Sheets

U.S. PATENT DOCUMENTS

| | | | |
|---|---|---|---|
| 4,614,113 A * | 9/1986 | Daghe et al. ............... | 73/201 |
| 4,679,442 A | 7/1987 | Kubota | |
| 4,911,018 A * | 3/1990 | Hartman ................ | 73/861.12 |
| 5,094,110 A | 3/1992 | Porter et al. | |
| 5,168,146 A | 12/1992 | Marshall et al. | |
| 5,235,860 A | 8/1993 | Horton et al. | |
| 5,541,394 A | 7/1996 | Kouchi et al. | |
| 5,605,739 A | 2/1997 | Stokes et al. | |
| 5,659,740 A | 8/1997 | Ezaki et al. | |
| 5,944,237 A | 8/1999 | Gouldson | |
| 6,381,510 B1 | 4/2002 | Amidhozour et al. | |
| 6,493,678 B1 | 12/2002 | Foster et al. | |
| 6,665,577 B2 | 12/2003 | Onyshkevych et al. | |
| 2003/0114810 A1 | 6/2003 | Weber | |
| 2003/0125695 A1 | 7/2003 | Dorschner | |
| 2003/0130905 A1 | 7/2003 | Foster et al. | |
| 2003/0135186 A1 | 7/2003 | Olson et al. | |

FOREIGN PATENT DOCUMENTS

| | | |
|---|---|---|
| EP | 0 471 865 | 2/1992 |
| JP | 2103418 | 4/1990 |
| JP | 145437 | 6/1992 |
| JP | 411061635 A | 3/1999 |
| JP | 02001113100 A | 4/2001 |
| WO | PCT/GB88/00993 | 6/1989 |

OTHER PUBLICATIONS

Elite Home Medical Supplies Order Form (Jobst Opaque Support Stockings).

* cited by examiner

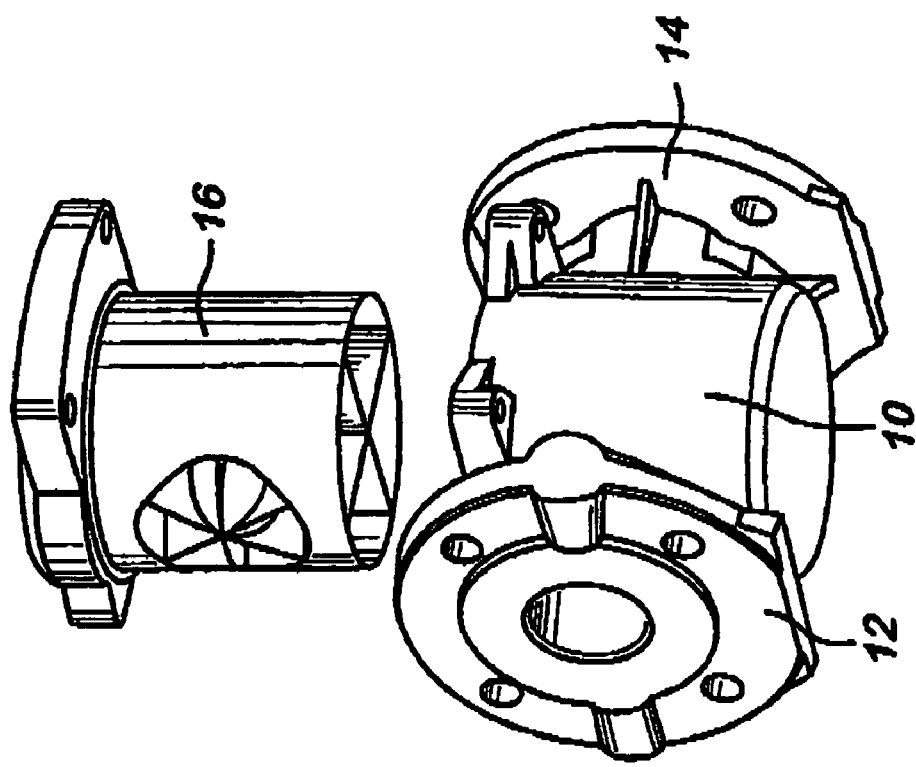
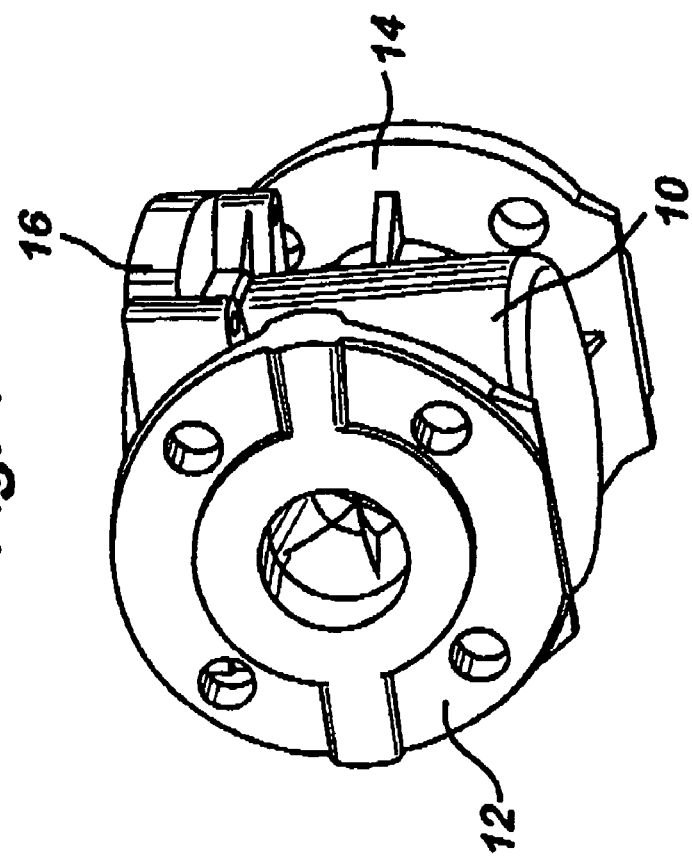

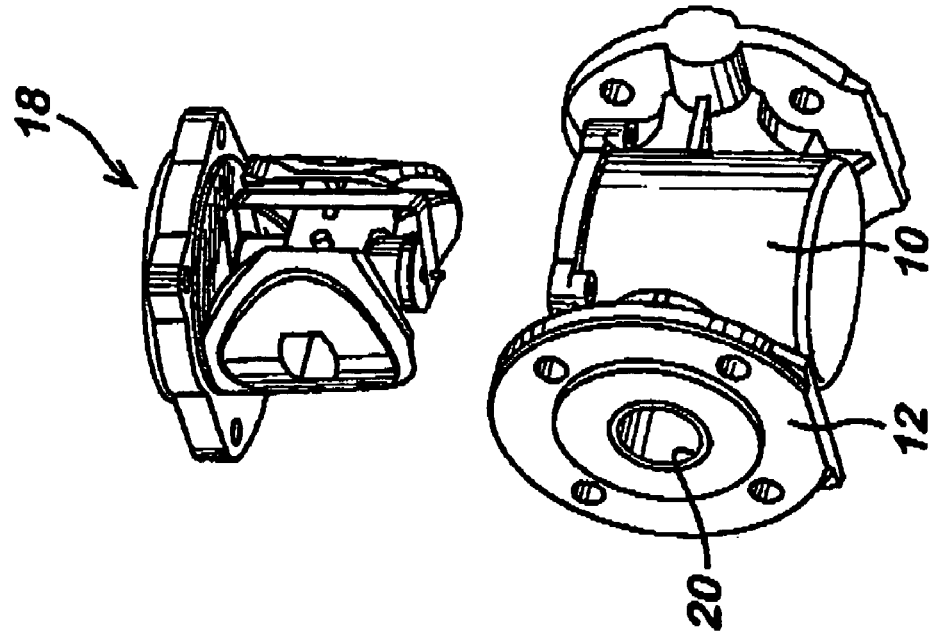
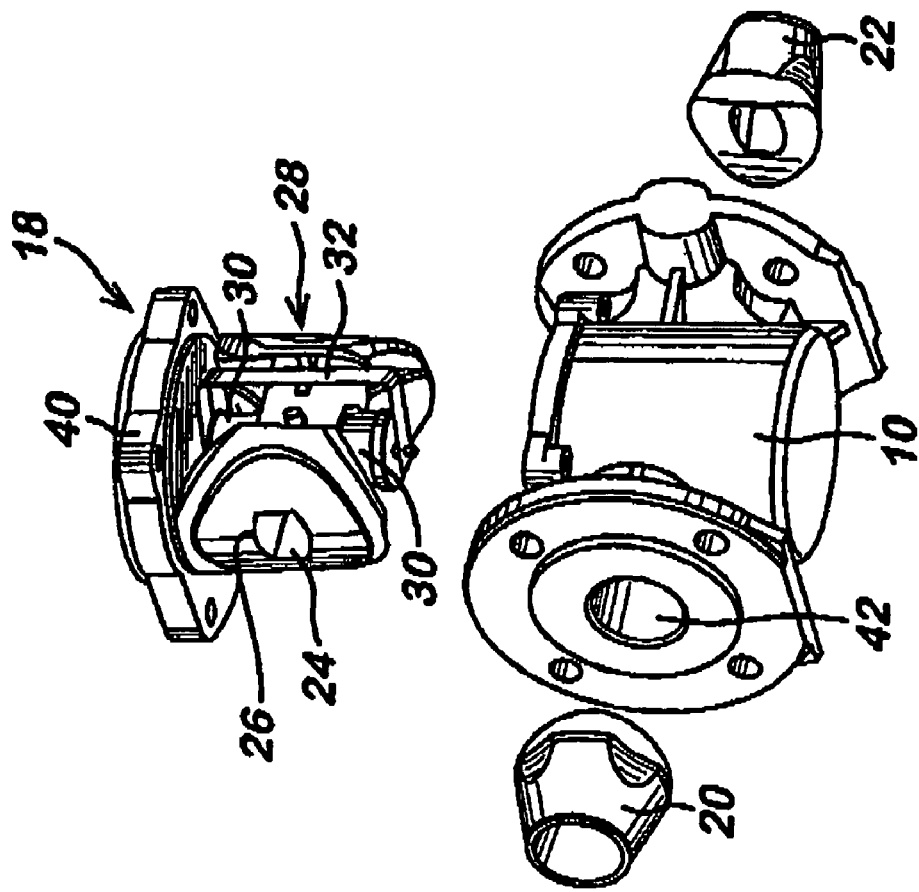

Section B-B

Section C-C

FLOWMETER

The present invention relates to non-mechanical flow meters, in a preferred embodiment to an electromagnetic flow meter, in particular to a flow meter primarily, but not exclusively, designed for commercial and network monitoring applications, and a method of installing the same.

Bulk flow meters monitor large flows of water for water systems management and commercial billing purposes. An example of a bulk flow meter is our H4000 (HELIX® 4000) Woltmann-type meter in which a rotor rotates in a measuring chamber receiving a flow of water from the mains supply and a revolution counter counts the number of revolutions of the rotor to provide a measurement of the volume of water passing through the meter. The H4000 meter is interposed between flanged upstream and downstream portions of a supply pipe so that the flow of water in the pipe flows directly through the meter. Such flow meters are typically referred to as "throughflow" meters. To facilitate maintenance, the measuring mechanism, including the rotor, measuring chamber and register, is removable from a body having flanged ends connected to the mains supply to enable a new pre-calibrated mechanism of the same type to be easily and quickly installed in the body.

Such "mechanical" flow meters are subject to wear of the moving part or parts of the meter. Any wear tends to cause the accuracy of the measurement of the amount of water passing through the meter to deteriorate. Mechanical flow meters are also prone to damage by suspended solids. As a result, the service life of such meters can be relatively short.

Electromagnetic meters do not suffer the problems of mechanical wear. However, one problem with known electromagnetic flowmeters is that they tend to be bulky devices, requiring substantial structures such as field generating coils and measurement apparatus attached to the exterior of the conduit in which the flow is to be measured. This can limit the applicability of electromagnetic flow meters in applications where space is at a premium, for lower flow rates. In addition, maintenance of the flow meters can be a major undertaking, requiring removal of a substantial section of pipe work with associated coils and meter equipment. Furthermore, generating a uniform magnetic field across a substantial conduit may require large amounts of power and may be difficult to achieve.

In at least its preferred embodiments the present invention seeks to solve these and other problems.

In a first aspect the present invention provides an electromagnetic flow meter configured as an insert for insertion into an in-situ housing connected in a flow line.

An electromagnetic flow meter operates by developing a magnetic field across a measurement duct, and detecting a voltage induced in water flowing in the duct the magnitude of the induced voltage being related to the velocity of the water flowing in the duct As the meter has no moving parts and is unaffected by suspended solids, its service life could be in excess of 20 years. Electromagnetic flow meters also tend to have a greater measuring range than mechanical flow meters. Such an electromagnetic flow meter Is described in our International patent application no WO 98/49528, the contents of which are incorporated herein by reference.

Replacement of mechanical through-flow meters with electromagnetic through-flow meters of the type described in WO98/49528 has not hitherto been contemplated, since it could be a time consuming, and thus costly exercise to remove the entire mechanical throughflow meter, including the flanged body connected to the mains supply, and install the new electromagnetic flow meter.

By configuring the electromagnetic flow meter as an insert for a housing already connected to a mains supply, this can enable an insert for a mechanical meter to be easily and quickly replaced to transform the meter into a more accurate and longer lasting electromagnetic flow meter.

The insert preferably comprises a flow measurement duct means for generating a magnetic field across the duct, and means for deriving a measurement of the rate of flow of fluid through the duct from the voltage induced by the magnetic field in fluid flowing through the duct.

In one preferred embodiment the insert comprises means for diverting part of the flow of fluid away from the duct. This can enable the amount of fluid flowing through the duct to be restricted to an amount within the measuring range of the meter, with the bulk of the fluid being diverted away from the duct. Preferably, the diverting means comprises at least one channel. The or each channel preferably extends about the duct. This can aid in minimizing the size of the or each insert so as to fit inside the housing.

Preferably, said one insert is shaped to provide said at least one channel. This can enable the duct generating means, deriving means and said at least one channel to be provided by a single insert.

Preferably, the or each channel is defined at least in part by the external surface of the insert. This can simplify the manufacture of the insert. Preferably, the insert is shaped to provide a pair of said channels extending about respective sides thereof. The or each channel preferably comprises a convergent inlet portion and a divergent outlet portion. As the duct typically has a convergent inlet portion and a divergent outlet portion, in order primarily to reduce the spacing between electrodes for detecting the voltage induced in fluid flowing through the duct, it is advantageous to shape each channel in a similar manner. This can assist in maintaining the flow of fluid through each channel at a rate which is proportional to the rate of flow of fluid through the duct, so that the flow measurement is proportional to the rate of flow of fluid through the meter, and can also enable the flow of fluid leaving the duct to recombine with the flow of fluid from each channel with minimum turbulence before flowing from the housing.

In another preferred embodiment, the meter comprises an additional insert for channelling the flow of fluid into the duct. This can enable the mouth of the duct to have a different shape to that of the inlet. The additional insert preferably comprises a sleeve having a convergent cross-section in order to channel the flow of fluid into the duct.

The present invention extends to an electromagnetic flow meter as aforementioned, comprising a housing connected to a flow line, the insert being inserted in said housing.

The housing preferably has an inlet substantially co-axial with an outlet thereof. The duct is preferably co-axial with the inlet and outlet.

The present invention also provides a method of installing an electromagnetic flow meter as aforementioned, comprising replacing a cartridge installed in a housing connected in a flow line with said insert or inserts In a further aspect the invention provides a cartridge insertable into a flow conduit, the cartridge having a through bore defining a flow passage, and metering means for measuring flow of fluid in the through bore.

In a preferred application, the meter is an electromagnetic flowmeter and the metering means comprises field generating means for generating a magnetic field across a fluid passing through the through bore; and sensing electrodes for sensing a potential developed in a fluid passing through the through bore.

In this way, rather Fan building a bulky flow meter around a conduit or having to replace a section of conduit with a flow meter, an electromagnetic flow meter cartridge can simply be inserted into the conduit without substantially increasing the dimensions of the conduit. Furthermore, because the through bore has smaller dimensions than the conduit, the flow velocity through the flow meter is greater than that in the conduit which can lead to improved measurement accuracy.

The cartridge is preferably provided in a fluid-proof housing.

The housing may have dimensions to occupy a conduit of predetermined standard dimensions. For example, the exterior dimensions of the housing may be arranged to fit within a standard circular or rectangular section conduit in which an insertion hole has been bored.

More preferably, the conduit is arranged to be inserted into a conduit insertion housing comprising first and second coupling portions for coupling with respective upstream and downstream flow conduits and a meter insertion orifice into which a cartridge containing a flow meter can be inserted.

In a further aspect the invention provides a flow metering kit comprising:

a conduit insertion housing comprising first and second coupling portions for coupling with respective upstream and downstream flow conduits and a meter insertion orifice into which a cartridge containing a flow meter can be inserted: and an insertable cartridge having a through bore defining a flow passage, and metering means for measuring flow of fluid in the through bore.

A preferred application is an electromagnetic flow meter. However, the cartridge assembly may be used to contain other flow metering equipment, such as a mechanical flow meter or an ultrasound or other flow meter.

In a further aspect, the invention provides a method of installing a flow meter in a conduit, the method comprising:

installing a housing in the conduit, the housing having an opening arranged to receive a cartridge containing a flowmeter; and installing a cartridge containing a flowmeter in the housing.

In a related aspect the invention provides a flowmeter for measuring the flow of fluid in a conduit, the flowmeter comprising:

a metering body comprising a housing containing a non-mechanical flowmeter arranged to measure the flow of fluid around the metering body; and mounting means for mounting the metering body in the path of fluid.

According to a preferred embodiment the invention provides a flowmeter for measuring the flow of fluid in a conduit the flowmeter comprising:

a metering body comprising a housing containing field generating means and potential sensing electrodes; and mounting means for mounting the metering body in the path of fluid.

Thus, by mounting the metering assembly inside the conduit In an "inside-out" arrangement, the dimensions of the flowmeter can be greatly reduced.

Preferably,the metering body is streamlined and preferably also the metering body is fluid-tight, in a preferred arrangement, the metering body is elongate, and the mounting means is arranged so that the axis of elongation is substantially parallel to the path of fluid flow.

Preferably, the dimensions of the metering body are chosen such that the fluid flow is either substantially undisturbed by the presence of the metering body, or such that the metering body defines the fluid flow. In most cases this means that the cross sectional surface of the metering body should either be substantially smaller than the conduit in which the metering body is to be mounted, or large enough (i.e. not much smaller than the internal section of the conduit) so that the fluid flow is defined by the (e.g. annular) gap between the internal surface of the conduit and the external surface of the metering body. The flow will not be strictly laminar, but it is preferred that the metering body is formed such that the flow is substantially laminar, at least in the vicinity of the metering body, so as to enable reliable measurements to be taken.

Advantageously, in one embodiment, the mounting means comprises a flange arranged to be clamped between adjacent flanges of conduit sections in a pipeline. This provides a particularly compact and readily insertable arrangement.

Preferably, the metering body is centrally mounted within the conduit.

In a particularly preferred implementation, the mounting assembly comprises a flange having means for axially aligning the metering body with the conduit. Preferably, the alignment means comprises at least one projection, preferably a plurality of projections arranged to engage with clamping bolts on rotation of the flange relative to the bobs. Thus, the exterior of the flange preferably comprises a series of partial spiral sections, the number of spiral sections corresponding to the number of clamping bolts, for example 4, preferably at least 3, the minimum diameter being less than the diameter between the bolts and the maximum diameter being greater than the diameter between the bolts so that a position exists which the exterior of the flange rests against the bolts. In the case of a flange for a larger diameter conduit, which may have a large number of bolts, projections may be provided to engage with only a proportion of the bolts. Between the bolt-engaging projections, the exterior should preferably have a generally circular section.

In a method aspect, the invention provides a method of installing a flowmeter in a pipeline, the method comprising:

providing adjacent separated portions of a pipeline and clamping a mounting flange to which is mounted an internal flowmeter between the adjacent sections of the flange.

As an alternative mounting arrangement, the flowmeter may be mounted in a cartridge. The cartridge can be inserted directly into the conduit or into a housing designed to take the conduit and connected with the remainder of the pipeline.

Preferred features of the present invention will now be described, by way of example only, with reference to the accompanying drawings in which:

FIG. 1 is a perspective view of an in-line mechanical flow meter;

FIGS. 2 to 5 are perspective views illustrating steps in the installation of a first embodiment of an electromagnetic flow meter.

FIG. 1 is a perspective view of an example of a mechanical in-line flow meter. The example is shown in FIG. 1 is our H4000 (HELIX®4000) Woltmann-type meter in which a rotor is rotated inside a measuring chamber by a flow of water received from the mains supply and the number of revolutions of the rotor is counted to provide a measurement of the volume of water flowing in the mains supply.

Figure 5:
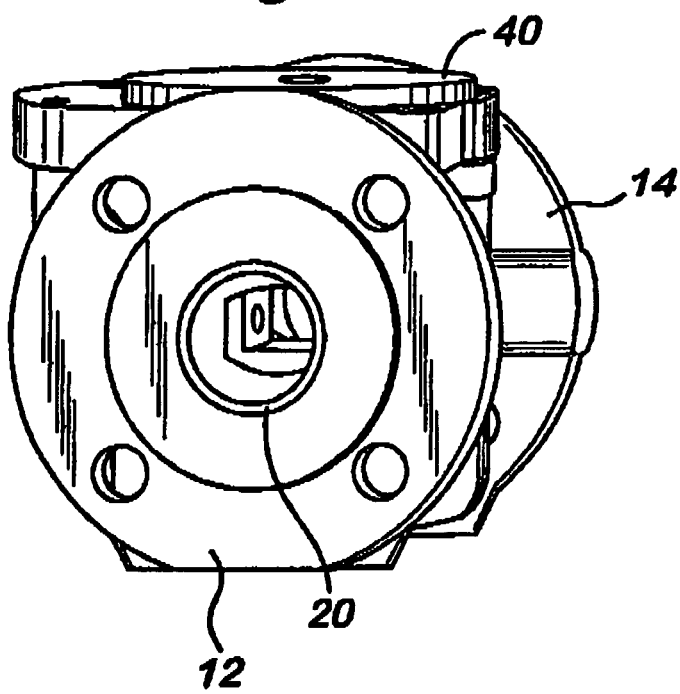

The meter includes a body 10 having co-axial flanged end portions 12, 14 for connection in a mains supply pipe between flanged ends of respective pipe sections. As shown more clearly in FIG. 2, as is typical of mechanical flow meters the measuring mechanism, which includes, inter alia, the rotor, measuring chamber, revolution counter and register, is housed inside an insert 16 insertable into the body 10 of the meter. This enables the insert 16 to be replaced by a new pre-calibrated insert at the end of the service lifetime of the meter without having to disconnect the body 10 from the mains supply.

The installation of an electromagnetic flow meter according to a first embodiment of the present invention will now be described with reference to FIGS. 2 to 5.

First, with reference again to FIG. 2, insert 16 is removed from the body 10 of the mechanical flow meter. Referring now to FIG. 3, in this first embodiment the insert 14 is replaced by three inserts 18, 20 and 22 of an electromagnetic flow meter. Insert 18 comprises a flow measurement duct 24. The duct 24 comprises a non-magnetic, non-conducting, non-permeable tube eg of a plastics material treated to render it impervious to water seepage under pressure. The tube has a substantially rectangular cross-section at its inlet 26 and outlet 28 ends blended by contraction (converging) and diffusion (diverging) portions to an intermediate portion of rectangular cross-section through which the rate of flow of fluid through the meter is determined. The duct 24 is shaped to achieve a uniform flow profile through the intermediate portion for a range of fluid flow rates in the duct with minimum variation in the pressure of the fluid leaving the duct at the outlet. A pair of electrode housings are provided in the duct, one electrode being disposed in each electrode housing so that the electrodes are disposed orthogonally across the direction of flow of fluid in said flow tube and orthogonal also to magnetic field.

Insert 18 also comprises means for generating a magnetic field across the duct. In this embodiment the generating means comprises first and second pole pieces for directing an alternating magnetic field across the measurement duct. Each pole piece is surrounded by an excitation coil 30 for generating the magnetic field in the pole pieces, with a return path 32 for the magnetic flux being provided between the upper and lower pole pieces Insert 18 further comprises means for deriving a measurement of the rate of flow of fluid through the duct from the voltage induced by the magnetic field in the fluid flowing through the duct. This is provided inside casing 40 of the inlet 18, and comprises circuitry for calculating the flow rate from the voltage detected by the electrodes which is induced in the fluid by the magnetic detail. Further details of this circuitry is contained in our aforementioned International application no WO98/49528. The casing 40 may include a display.

As shown in FIG. 3, the bore of the duct 24 has a different shape than that of the inlet 42 of the flanged end portion 12 of the body 10. In order to channel fluid flowing from the inlet 42 into the duct 24, insert 20 in the form of a convergent sleeve is inserted into the inlet 42 in order to channel fluid flowing from the inlet into the duct. A similar insert 22 in the form of a divergent sleeve is inserted into the outlet of flanged portion 14 in order to channel fluid flowing from the duct to the outlet.

To install the electromagnetic flow meter, as shown In FIG. 4 first the sleeves 20 20 and 22 are inserted into the inlet and outlet respectively of the flanged portions 12, 14 of the body 10. Insert 18 is then inserted into the body so that the duct 2415 is co-axial with the inlet and outlet, the resultant electromagnetic flow meter being shown in FIG. 5. The measurement of the rate of flow of fluid through the duct 24 is proportional to the rate of flow of fluid in the mains supply, and so the circuitry of the meter can be calibrated so that the display indicates the volume of fluid passing through the meter.

Figure 6:
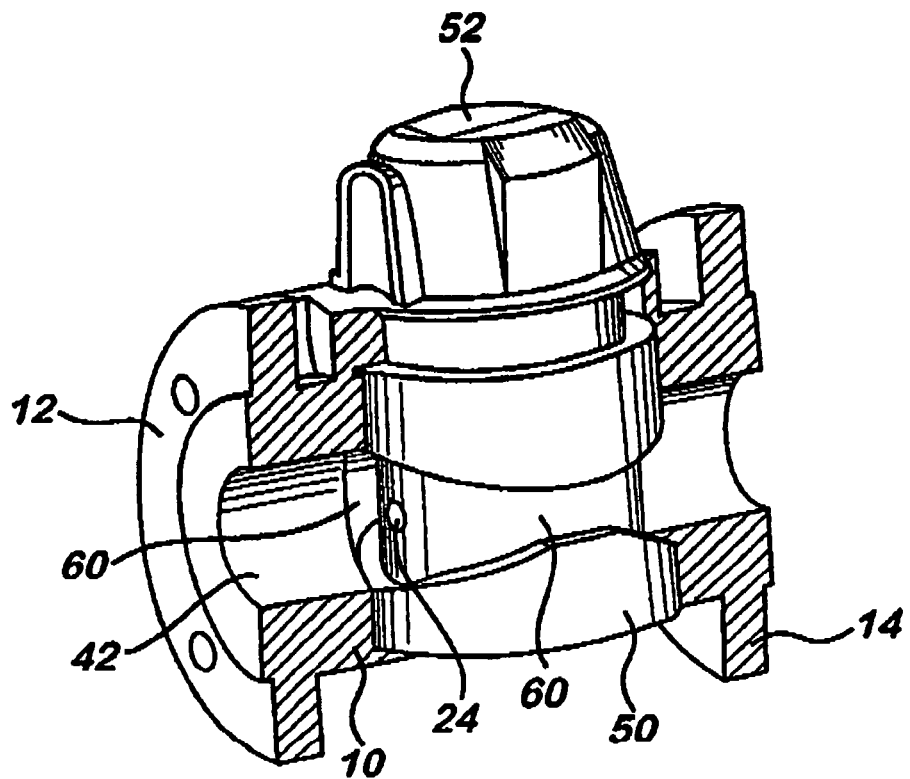
FIG. 6 illustrates a second embodiment of an electromagnetic flow meter.
Figure 7:
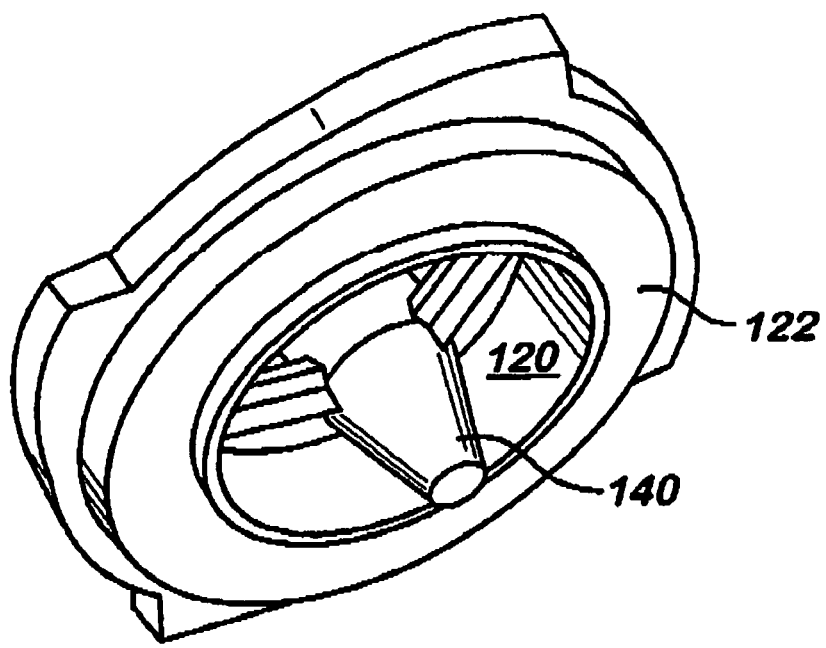
FIG. 7 is a perspective view of a third embodiment.
Figure 8:
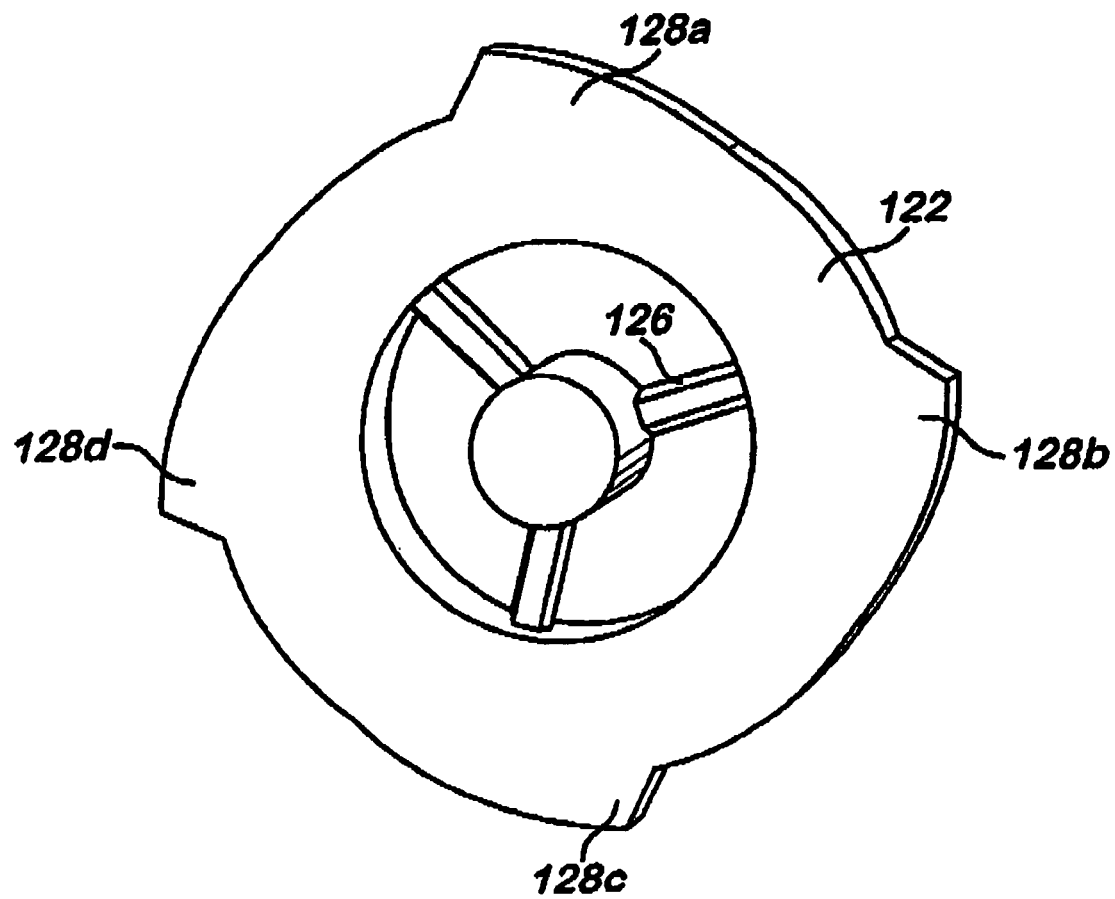
FIG. 8 is a perspective view showing detail of the self-centring clamping flange.
Figure 9:
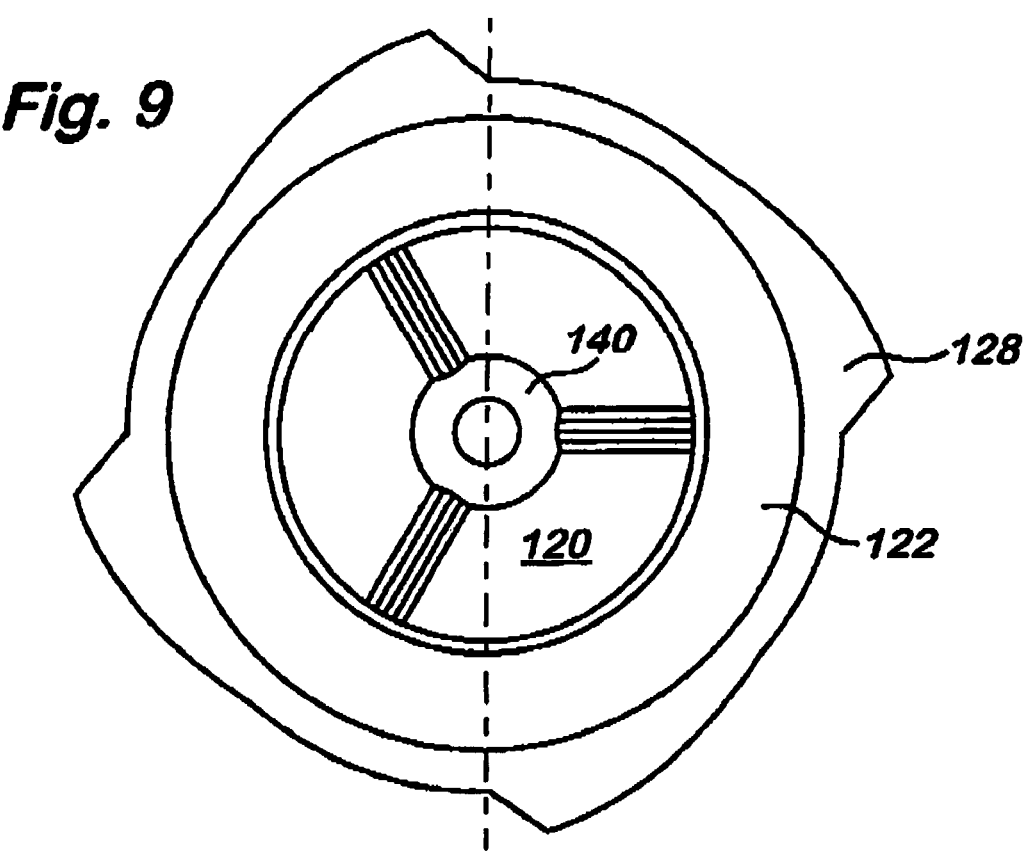
FIG. 9 is a plan view of the third embodiment.
Figure 10:
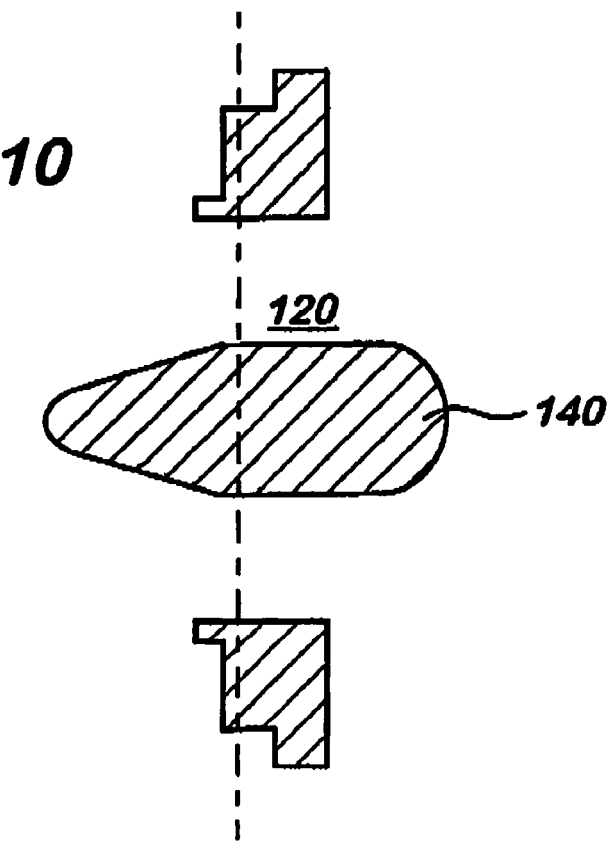
FIG. 10 is sectional view of the third embodiment.
Figure 11:
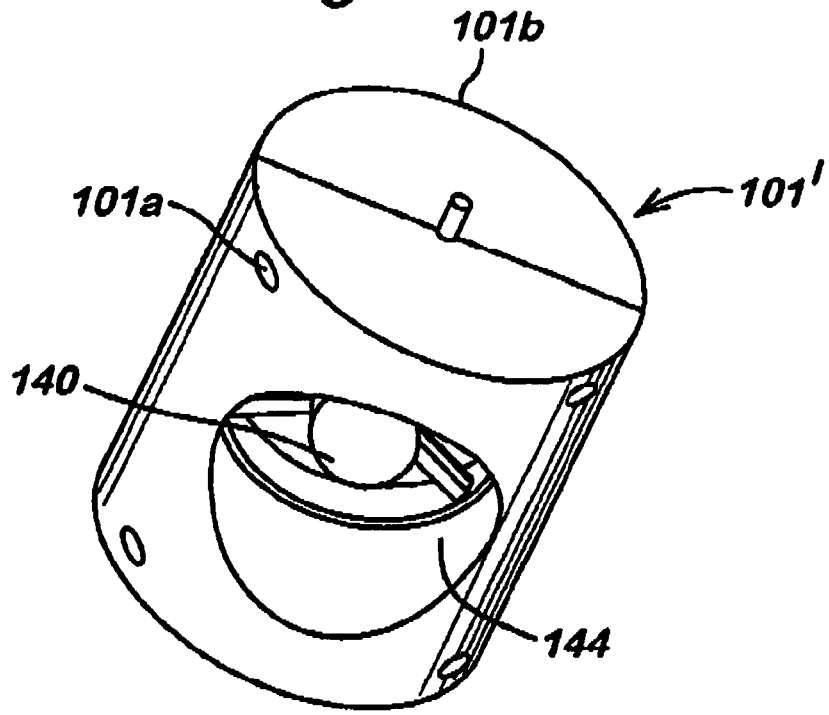
FIG. 11 is a schematic perspective view of an insertable cartridge in accordance with a fourth embodiment of the invention.
Figure 12:
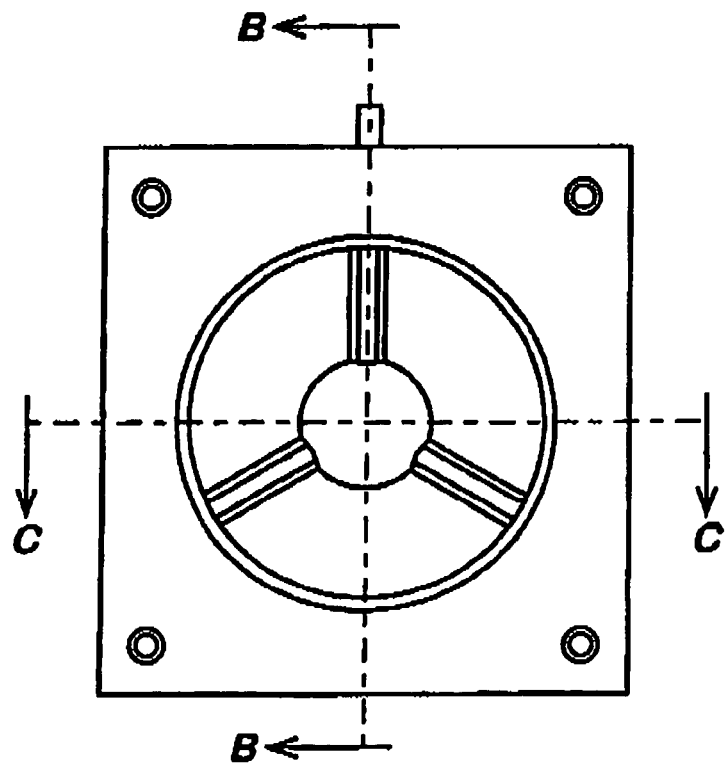
FIG. 12 is a front view of the embodiment of FIG. 11.
Figure 13:
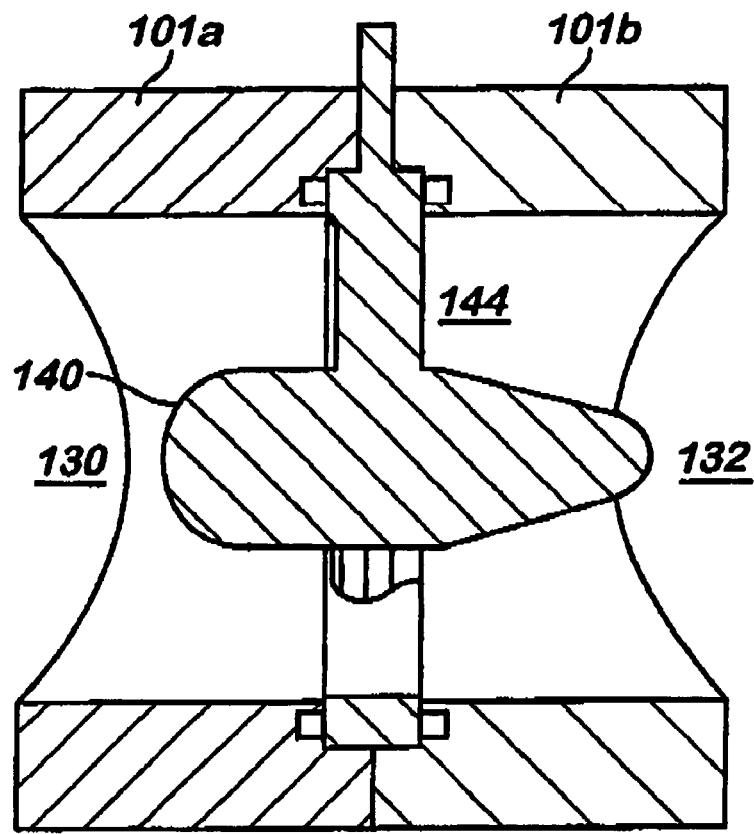
FIG. 13 is a section through B—B of FIG. 12.
Figure 14:
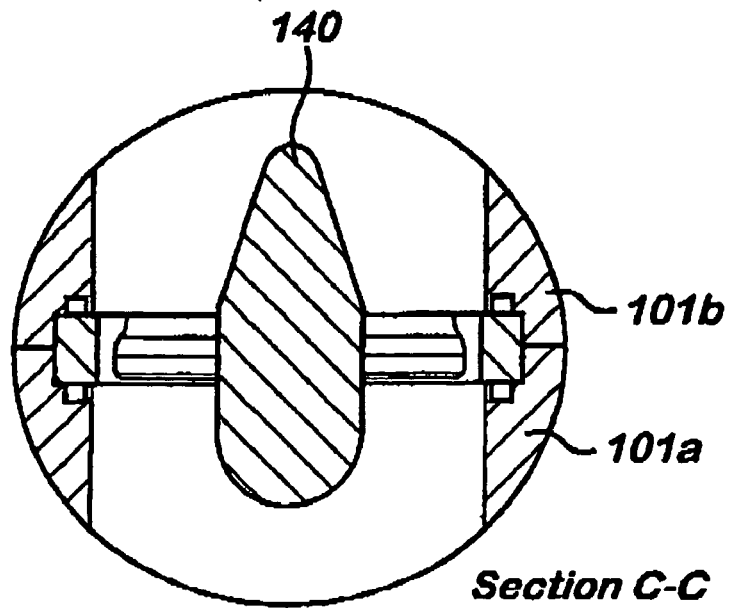
FIG. 14 is a section through C—C of FIG. 12.

FIG. 6 illustrates a second embodiment of an electromagnetic flow meter according to the present invention. The second embodiment is similar to the first embodiment, in that an insert 50 comprising a flow measurement duct 24, generating means, deriving means and a display 52 is inserted into the body 10. However, in this second embodiment the insert is in the form of a cartridge 50 housing the flow measurement duct, generating means and deriving means. To minimise costs, the working parts of an electromagnetic flow meter intended for domestic metering applications may form the basis of the cartridge 50. In this embodiment, the external surface of the cartridge 50 is shaped to define, with the internal surface of the body 10, channels 60 extending about the duct 24, so that only part of the flow of fluid from the inlet 42 enters the duct and the remainder of the flow of fluid is diverted away from the duct and towards the outlet in flanged portion 14. As shown in FIG. 6, each channel 60 comprises a convergent inlet portion and a divergent outlet portion. In operation, most of the flow of fluid entering the meter is diverted away from the duct 24 by the channels 60, so that the amount of fluid entering the measurement duct is within the normal measuring range of the meter. As the duct has a convergent and divergent portions, in order primarily to reduce the spacing between electrodes for detecting the voltage induced in fluid flowing through the duct, it is advantageous to shape each channel 60 in a similar manner. This can assist in maintaining the flow of fluid through each channel at a rate which is proportional to the rate of flow of fluid through the duct 24, so that the flow measurement is proportional to the rate of flow of fluid through the meter, and can also enable the flow of fluid leaving the duct 24 to recombine with the flow of fluid from each channel 60 with minimum turbulence before flowing from the outlet of the body 10. As in the first embodiment, the circuitry of the meter can be calibrated so that the display indicates the volume of fluid passing through the meter.

As described above, the present invention enables a mechanical flow meter to be easily and quickly replaced by an electromagnetic flow meter. In comparison to a mechanical flow meter, an electromagnetic flow meter is not subject to wear and is unaffected by suspended solids, and thus has a greater service lifetime. Another advantage of the present invention is that there is no need to replace the body 10 in order to install the electromagnetic flow meter. Accordingly, installation of the electromagnetic flow meter is facilitated, as there is no need to disconnect the body from the mains supply. In addition, the initial investment in the body 10 of the mechanical meter and its installation is maintained, as the body 10 is not discarded.

In the above, reference has been made to a H4000 mechanical meter. However, it will be appreciated that the invention is not limited to replacement of only this particular type of meter by an electromagnetic flow meter, but is applicable for use in replacing all types of mechanical meter in which the measuring mechanism is inserted or otherwise located in a body.

To summarize the above, an electromagnetic flow meter is configured as an insert for insertion into an in-situ housing connected in a flow line. This can enable a body previously installed for use with an insert of a mechanical flow meter to be adapted for use with an insert of an electromagnetic flow meter without having to disconnect the body from a mains supply.

Referring now to FIGS. 7 to 10, a third embodiment will now be described. A metering body 140 contains field generating coils and sensing electrodes (not shown). This is suspended within the bore 120 of a mounting member 122 comprising a flange by means of 3 symmetrically disposed struts 126. The flange has four protrusions 128a, 128b, 128c, 128d which extend in a generally spiral fashion from a relatively small radius over a relatively large radius whereby, on rotation of the flange, a portion of the projections can be brought into contact with mounting bolts.

The wiring for the field generating coil and the sensing electrodes is carried to the exterior through a passage in one or more of the mounting struts 126 and is connected to a conventional flowmeter control apparatus.

Referring to FIGS. 11 to 14, a fourth embodiment is shown.

In the fourth embodiment, a similar "inside-out" flowmeter is used. However, the mounting assembly for this comprises a cartridge 101' which, in this embodiment, is formed of an upstream housing 101a and a downstream housing 101b. This defines a through bore 144, having an inlet 130 and an outlet 132. A flowmeter metering body 140 is suspended within through bore. A sealing ring, not shown, may be mounted between the two housing portions. The flowmeter metering body contains field generating means within the flowmeter metering body 140 and has potential sensing electrodes on the exterior of the flowmeter metering body 140. Thus, the flow velocity sensed is that of the fluid flowing in the annular space between the flowmeter body 140 and the interior of the housing 101'.

Figure 15:
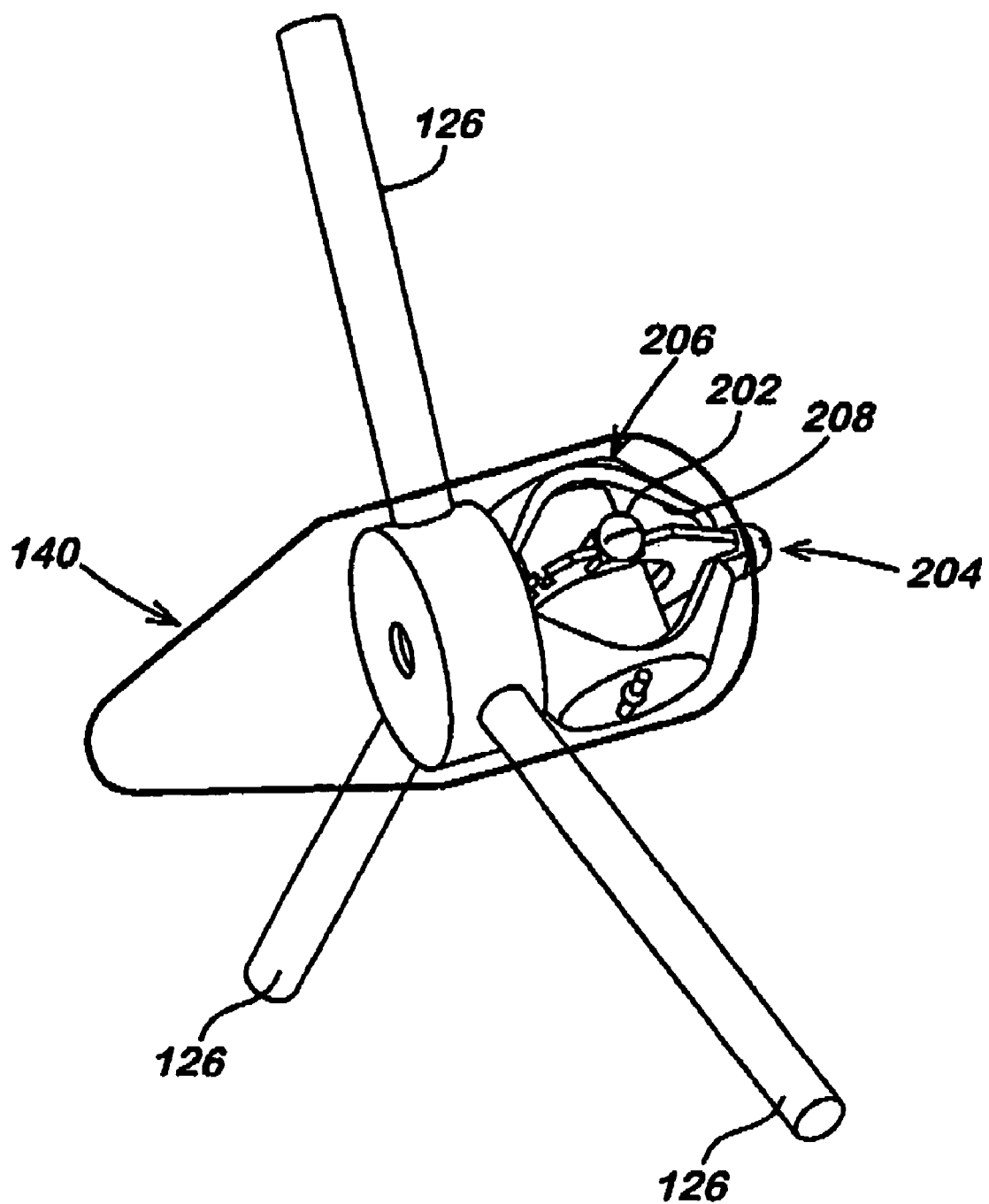
FIG. 15 is an exploded view showing internal detail of the metering body of the third and fourth embodiments.
Figure 17:
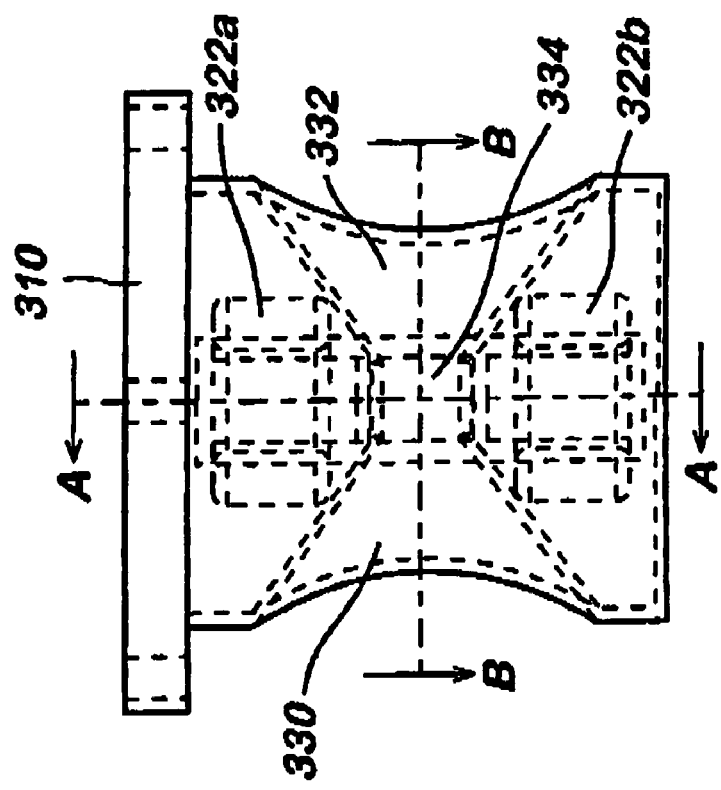
FIG. 17 is a schematic view of the embodiment of FIG. 16 showing interior details.
Figure 16:
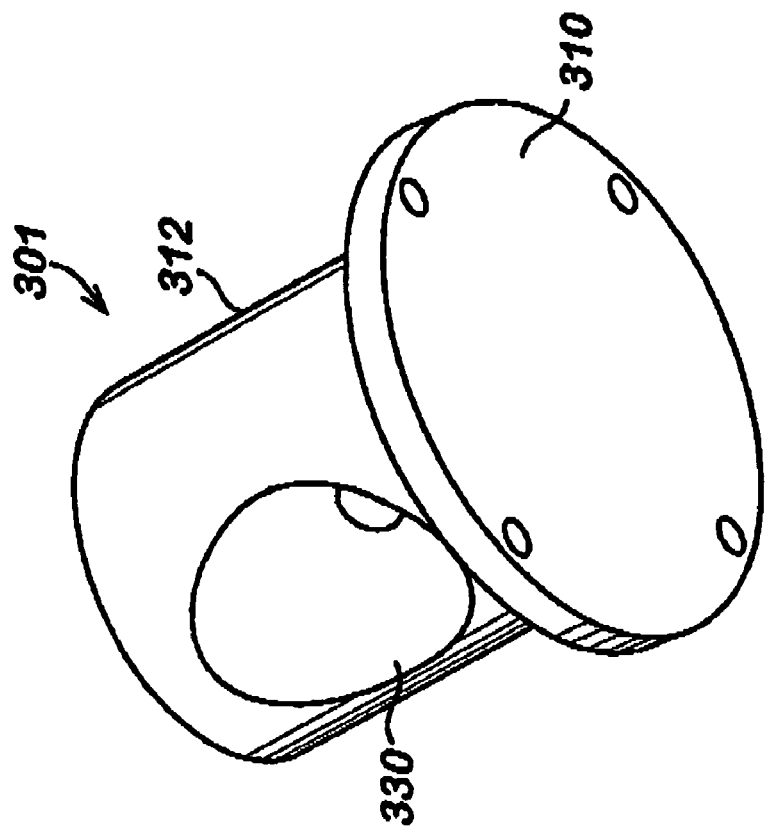
FIG. 16 is a schematic perspective view of an insertable cartridge in accordance with the fifth embodiment of the invention.
Figure 18:
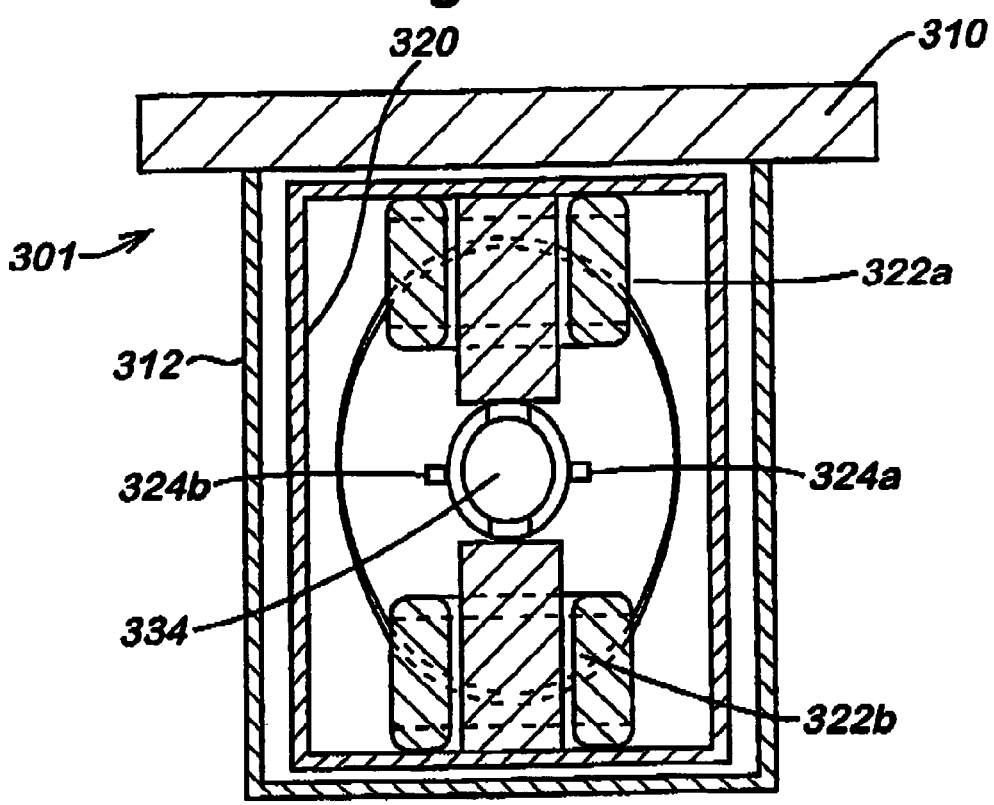
FIG. 18 shows a section through A—A of FIG. 17 showing interior details.
Figure 19:
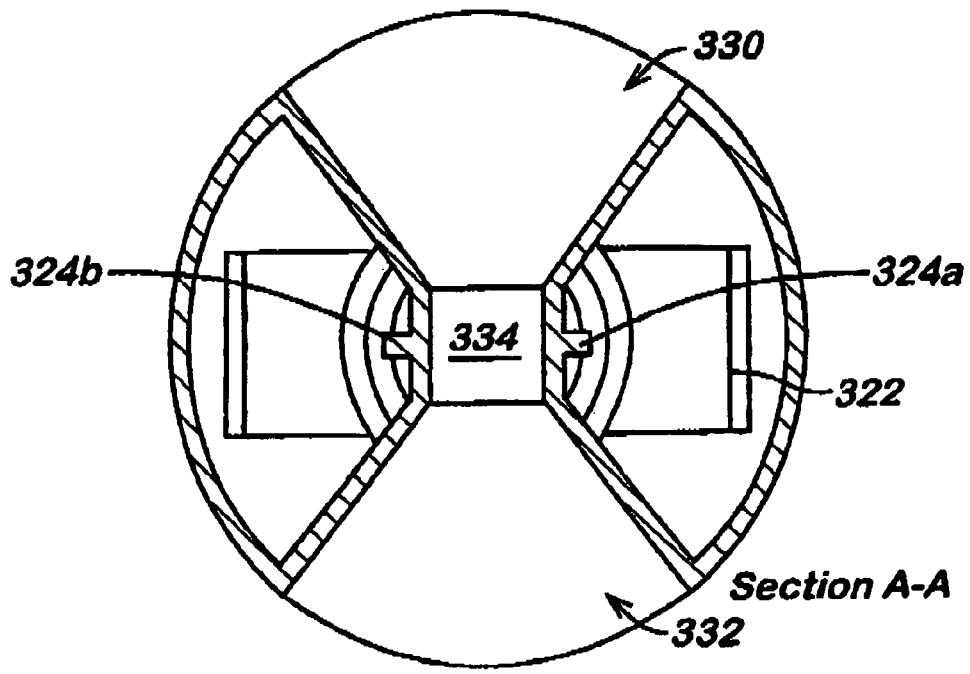
FIG. 19 is a section through B—B of FIG. 17 illustrating tapering of the through bore upstream and downstream of the measuring location.

Referring to FIG. 15, the internal structure of the metering body 140 will be explained. The same or similar structure may be employed with the mounting means of either embodiment or other mounting structures. The metering body 140 has two electrodes 202 (only one of which is shown) on opposite sides of the body for sensing the potential developed across the fluid. A further electrode 204, mounted centrally (here at the upstream end of the body) is provided as an earthing electrode or earth reference electrode. This is particularly useful in providing an earth reference when the mounting means does not earth the fluid (for example in the case of a cartridge made of plastics material; a particularly advantageous construction comprises a plastics metering body and an earthing electrode mounted substantially centrally within the fluid). An iron circuit 206 is provided defining coil spaces 208 in which field generating coils are wound (for sake of clarity, the coils themselves are not shown in FIG. 15).

It will be appreciated that modifications of detail may be made. In particular, the mounting arrangements may be varied to suit a variety of conduits, the important principle being that the flowmeter is mounted within a conduit and that the fluid flows around rather than through the flowmeter. For example, the metering body could even be mounted in a conventional spool of pipeline, although this of course diminishes the advantages of having a compact metering body. Metering body dimensions of the order of a centimetre or two in diameter are possible and considerable advantages are obtainable in the case of small metering bodies. The metering body may be formed most advantageously from plastics material. The principles may, however, be employed with much larger meters, for mounting in pipelines up to a metre or even more in diameter. In the latter case, a considerable saving may be made by obviating the need for a large spool in which the meter is assembled and power requirements may also be reduced. In the case of a large bore meter in particular, the meter need not be mounted separately, but may be mounted on a boom, in some cases movably.

A fifth embodiment will now be described.

Referring to FIGS. 16 to 19, the cartridge has a mounting flange and a fluid proof housing 312. Within the fluid proof housing is an iron circuit 320 having coils 322a, 322b. Also mounted within the housing and protruding to make contact with the fluid are electrodes 324. The housing provides a tapered inlet orifice 330 and tapered outlet orifice 332 either side of metering through bore 334.

The field generating coils and electrodes are connected to the control apparatus of a flow meter in the normal way.

In certain cases, the metering through bore may have a square section and may be larger. In certain applications, only a single coil may be provided to generate the field.

Figure 20:
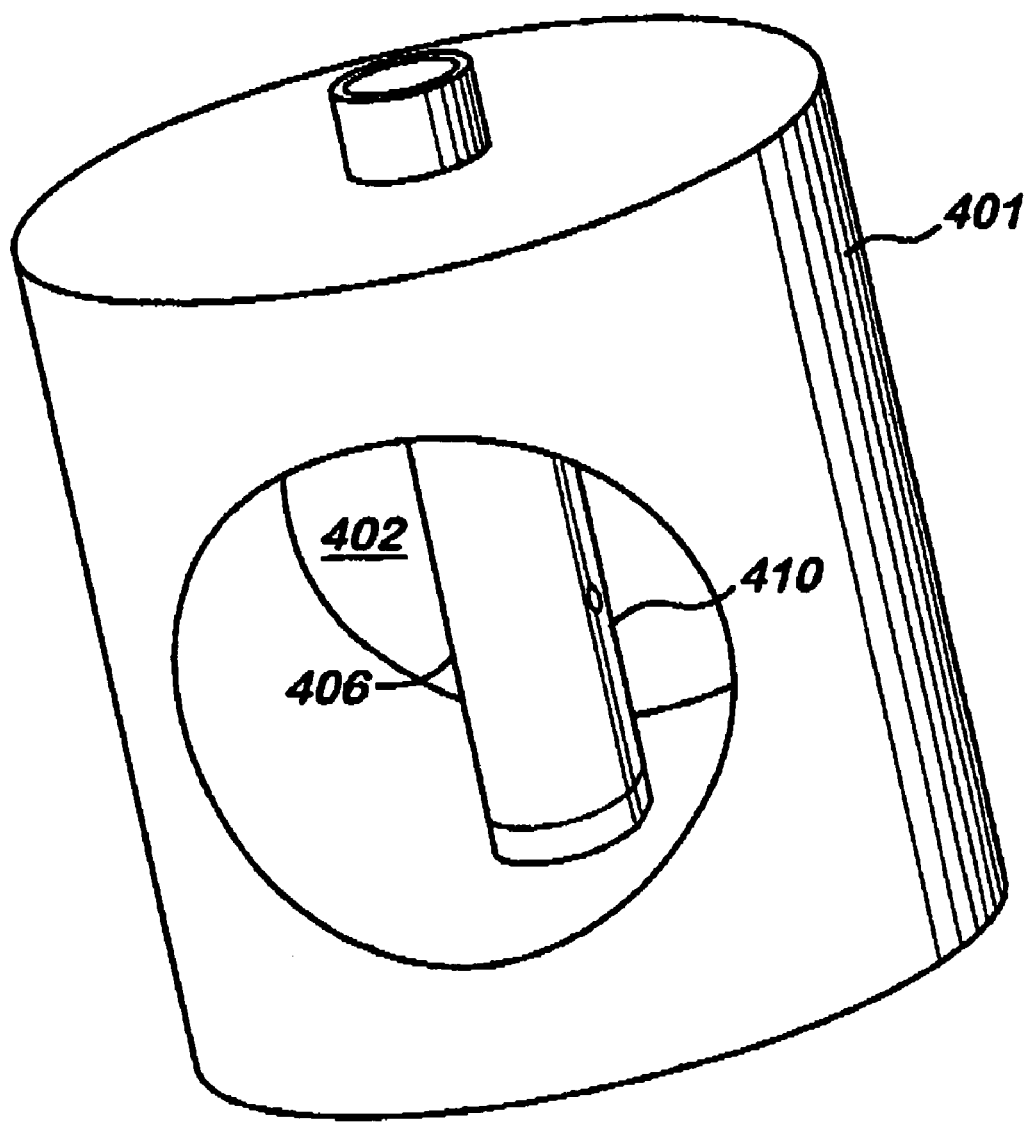
FIG. 20 shows a perspective view of an insertable cartridge according to a further embodiment.
Figure 22:
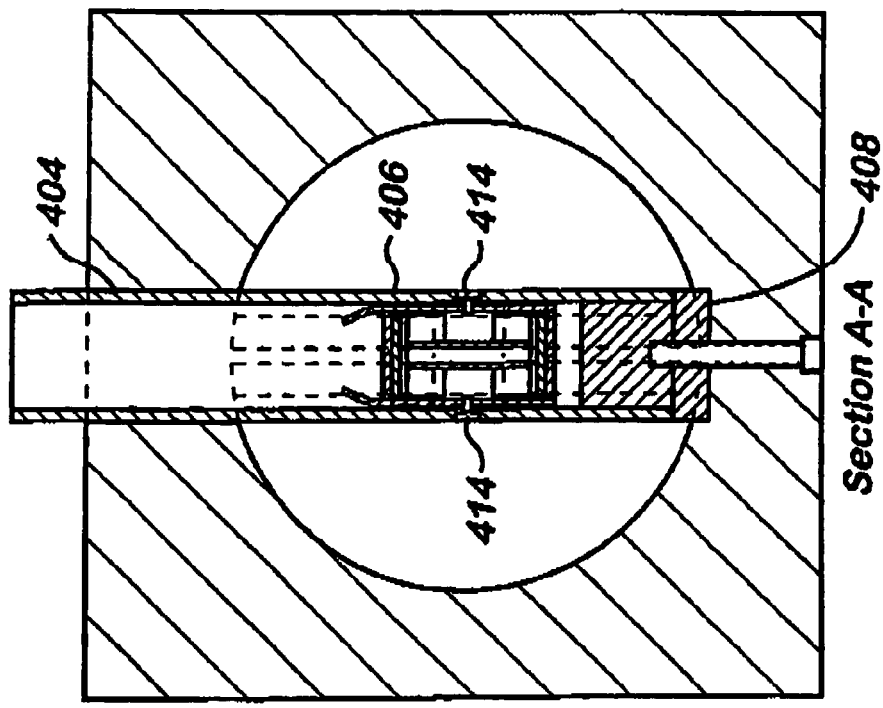
FIG. 22 shows a section through A—A of FIG. 21.
Figure 21:
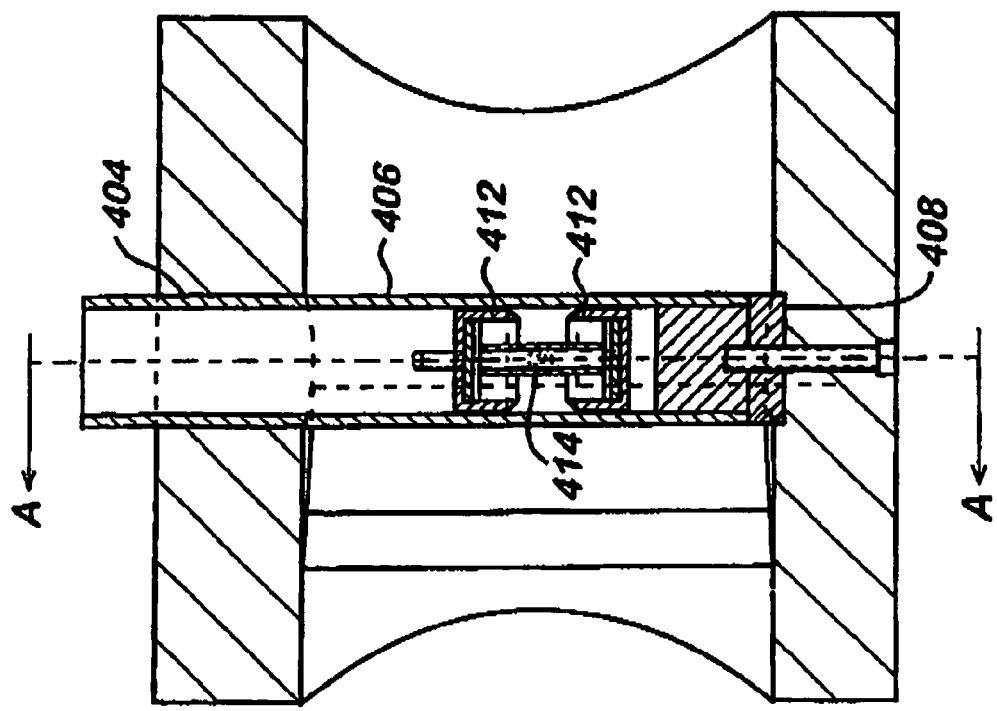
FIG. 21 shows a side view (in section) of the cartridge of FIG. 20.

A preferred embodiment is shown in FIGS. 20 to 22. These drawings show a cartridge 401 similar to that illustrated in FIG. 11. The cartridge 401 has a bore 402 through which the fluid may flow. A bore 404 Is provided in the cartridge (in FIG. 20 at a central position through the top wall of cartridge 401) for receiving a metering housing 406 having an elongate body. A corresponding bore or recess 408 is provided in the bottom wall of the cartridge, also for receiving the metering housing 406 (FIGS. 21 and 22), so the metering body extends perpendicular to the direction of flow through bore 402. The metering housing 406 can be of cylindrical section, but is preferably, as shown at 410 in FIG. 20, of streamlined profile. The metering housing may also be cylindrical on insertion into cartridge 401, and a wedge shaped body or similar is attached to the cylindrical metering housing 40 after insertion into the cartridge so as to form a composite structure having a streamlined section.

An iron circuit 412 is provided within metering housing 406. Field generating coils are located within iron circuit 412 such that a magnetic field is generated whose axis extends parallel to the metering housing 406. Electrodes 414 are provided for measuring a potential difference therebetween.

As shown in FIGS. 20 to 22, no metering duct is provided. The fluid flows around the metering body.

Each feature disclosed in the description, and/or the claims and drawings may be provided independently or in any appropriate combination. In particular a feature of a subsidiary claim may be incorporated in a claim for which it is not dependent

The invention claimed is:

1. A non-mechanical flow meter comprising:
   a housing connectable in a conduit such that the housing extends across the conduit and all fluid flowing in the conduit passes through the housing; and
   a self-contained non-mechanical flow measurement cartridge for the measurement of flow in the conduit,
   wherein the cartridge is configured for removable insertion into the housing while the housing is in-situ in the conduit.

2. A flowmeter according to claim 1 wherein the flowmeter is arranged to measure the flow of fluid around measuring components of the cartridge; and the flowmeter comprises a mounting for mounting the measuring components in the path of fluid.

3. A flowmeter according to claim 2, wherein the cartridge contains field generating means for generating a magnetic field in the fluid around the measuring components and potential sensing electrodes for sensing potential induced in the fluid around the measuring components.

4. A flowmeter according to claim 2, wherein the mounting is configured for axially aligning the cartridge with the conduit.

5. A flowmeter according to claim 2, wherein the mounting comprises a flange arranged to be clamped between adjacent flanges of conduit section in a pipeline.

6. A flowmeter according to claim 4, wherein the mounting comprises at least one projection arranged to engage with clamping bolts on rotation of the flange relative to the bolts.

7. A flowmeter according to claim 5, wherein the mounting comprises at least one projection arranged to engage with clamping bolts on rotation of the flange relative to the bolts.

8. A flowmeter according to claim 1, wherein the mounting is configured to position the cartridge on a central flow axis of the conduit.

9. A flowmeter according to claim 1 wherein the cartridge is fluid-tight.

10. An electromagnetic flow meter according to claim 1 wherein the cartridge comprises a flow measurement duct, means for generating a magnetic field across the duct, and means for deriving a measurement of the rate of flow of fluid through the duct from the voltage induced by the magnetic field in fluid flowing through the duct.

11. A meter according to claim 10, wherein the cartridge comprises means for diverting part of the flow of fluid through the housing away from the duct.

12. A meter according to claim 11, wherein the diverting means comprises at least one channel.

13. A meter according to claim 12, wherein said at least one channel extends about the duct.

14. A meter according to claim 13, wherein the or each channel is defined at least in part by an external surface of the cartridge.

15. A meter according to claim 12, wherein the or each channel comprises a convergent inlet portion and a divergent outlet portion.

16. A meter according to claim 15, wherein the measurement duct has a convergent/divergent profile similar to that of the at least one channel.

17. A meter according to claim 10, comprising an insert for channeling fluid into the duct.

18. A meter according to claim 17, wherein said insert comprises a sleeve having a convergent or a divergent cross-section.

19. A meter according to claim 1 wherein the housing has an inlet substantially co-axial with an outlet thereof.

20. A method of installing a flow meter according to claim 1, comprising replacing a mechanical flowmeter cartridge installed in a housing connected in a flow line with said cartridge.

21. A flowmeter according to claim 1, wherein the cartridge is elongate and is mounted so that the axis of elongation is substantially parallel to the direction of fluid flow.

22. A flowmeter according to claim 1, wherein the cartridge is elongate and is mounted so that the axis of elongation is substantially perpendicular to the direction of fluid flow.

23. A non-mechanical flow meter comprising:
   a housing connectable in a conduit such that the housing extends across the conduit and all fluid flowing in the conduit passes through the housing, the housing having an aperture for insertion of a self-contained flow measuring cartridge and a seating proximate the aperture for receiving a conforming part of the cartridge; and
   a self-contained non-mechanical flow measurement cartridge for the measurement of flow in the conduit,
   wherein the cartridge is configured for removable insertion into the housing via the aperture while the housing is in-situ in the conduit by movement transversely of a flow axis of the conduit, and comprises a part conforming in shape to the seating, and configured to be fixed thereto.

24. A meter according to claim 23, wherein the seating and the conforming part are flange surfaces.

25. A non-mechanical flow meter comprising:
   a housing connectable in a conduit such that the housing extends across the conduit and all fluid flowing in the conduit passes through the housing, from an inlet thereof to an outlet thereof;
   a self-contained non-mechanical flow measurement cartridge for the measurement of flow in the conduit;
   wherein the housing comprises inlet and outlet coupling portions for coupling with respective upstream and downstream portions of the conduit and having respectively a flow inlet and a flow outlet;
   wherein the cartridge is configured for removable insertion into the housing while the housing is in-situ in the conduit and has a measuring section of different flow cross-section to that of the flow inlet and the flow outlet, the meter defining a convergent flow passage from the inlet to the measuring section and a divergent flow passage from the measuring section to the outlet.

26. A meter according to claim 25, wherein the convergent and the divergent passages are defined by separate inserts in the housing upstream and downstream of the cartridge.

27. A non-mechanical flow meter comprising:
a housing connectable in a conduit such that the housing extends across the conduit and all fluid flowing in the conduit passes through the housing; and
a self-contained non-mechanical flow measurement cartridge for the measurement of flow in the conduit;
wherein the cartridge is configured for removable insertion into the housing while the housing is in-situ in the conduit and has a measuring section which is centrally disposed in the flow through the housing; and
wherein the housing and the cartridge define channels which divert part of the fluid around opposite sides of the measuring section and wherein the channels each have a convergent inlet portion and a divergent outlet portion.

* * * * *